United States Patent [19]

Neal

[11] 3,917,314

[45] Nov. 4, 1975

[54] ANTI-JACKKNIFING FIFTH WHEEL ASSEMBLY

[75] Inventor: Gary R. Neal, Baltimore, Md.

[73] Assignees: James E. Neal, Jr., Baltimore; Henry O. Hubich, Upperco, both of Md. ; a part interest

[22] Filed: Mar. 22, 1974

[21] Appl. No.: 453,984

[52] U.S. Cl. .................................. 280/432; 280/432
[51] Int. Cl.² ......................................... B62D 53/06
[58] Field of Search .................................... 280/432

[56] References Cited
UNITED STATES PATENTS

| | | | |
|---|---|---|---|
| 2,461,212 | 2/1949 | Hanna | 280/432 |
| 3,250,547 | 5/1966 | Myers | 280/432 |
| 3,618,983 | 11/1971 | Forse | 280/432 |

*Primary Examiner*—Leo Friaglia
*Attorney, Agent, or Firm*—Clarence A. O'Brien; Harvey B. Jacobson

[57] ABSTRACT

Relatively shiftable and drivingly interconnected components are provided on a tractor vehicle equipped with a rotatable fifth wheel plate to which an associated trailer may be releasably coupled. One of the relatively shiftable components is supported from and shiftable relative to the tractor vehicle and the other component is mounted on the rotatable fifth wheel plate. The shiftable component supported from the tractor may be shifted, as a result of relative angular displacement of the tractor and trailer, only to those positions thereof which would normally be effected by relative angular displacement of the tractor and trailer if the front wheels of the tractor were held stationary in adjusted positions and the combination of the tractor and semi-trailer was moving forward with no side slippage of the wheels of the tractor and the semi-trailer.

10 Claims, 14 Drawing Figures

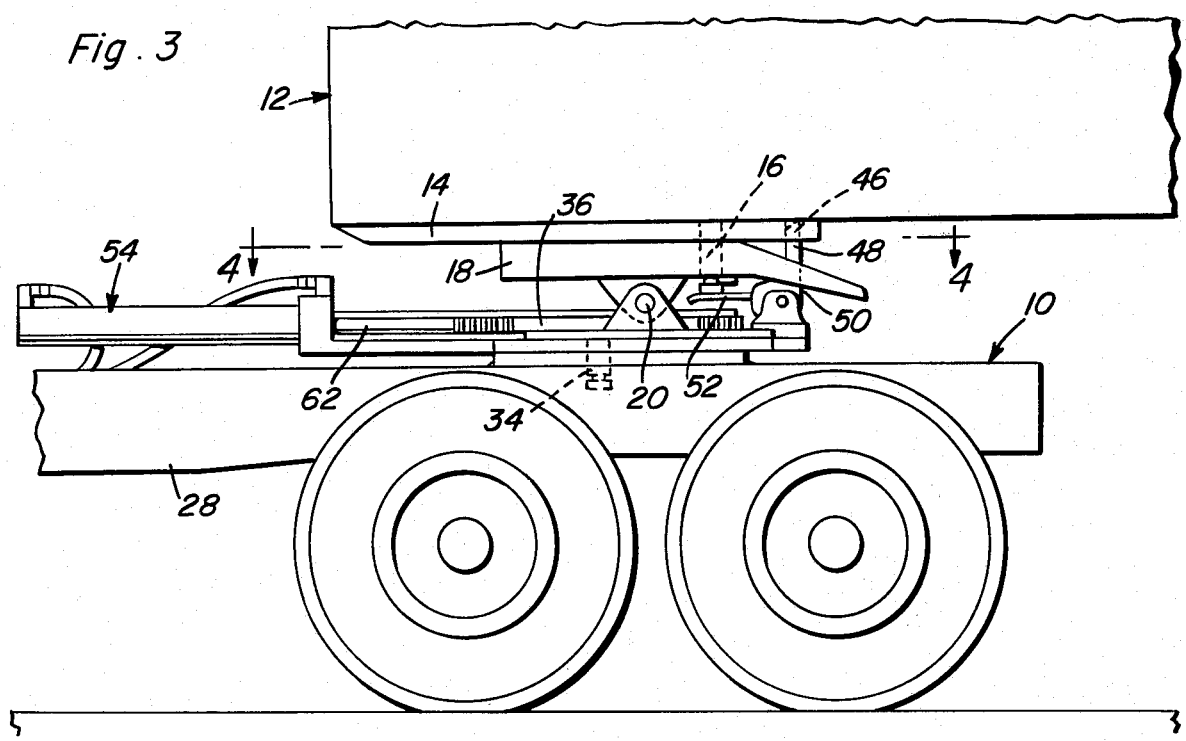
Fig. 3
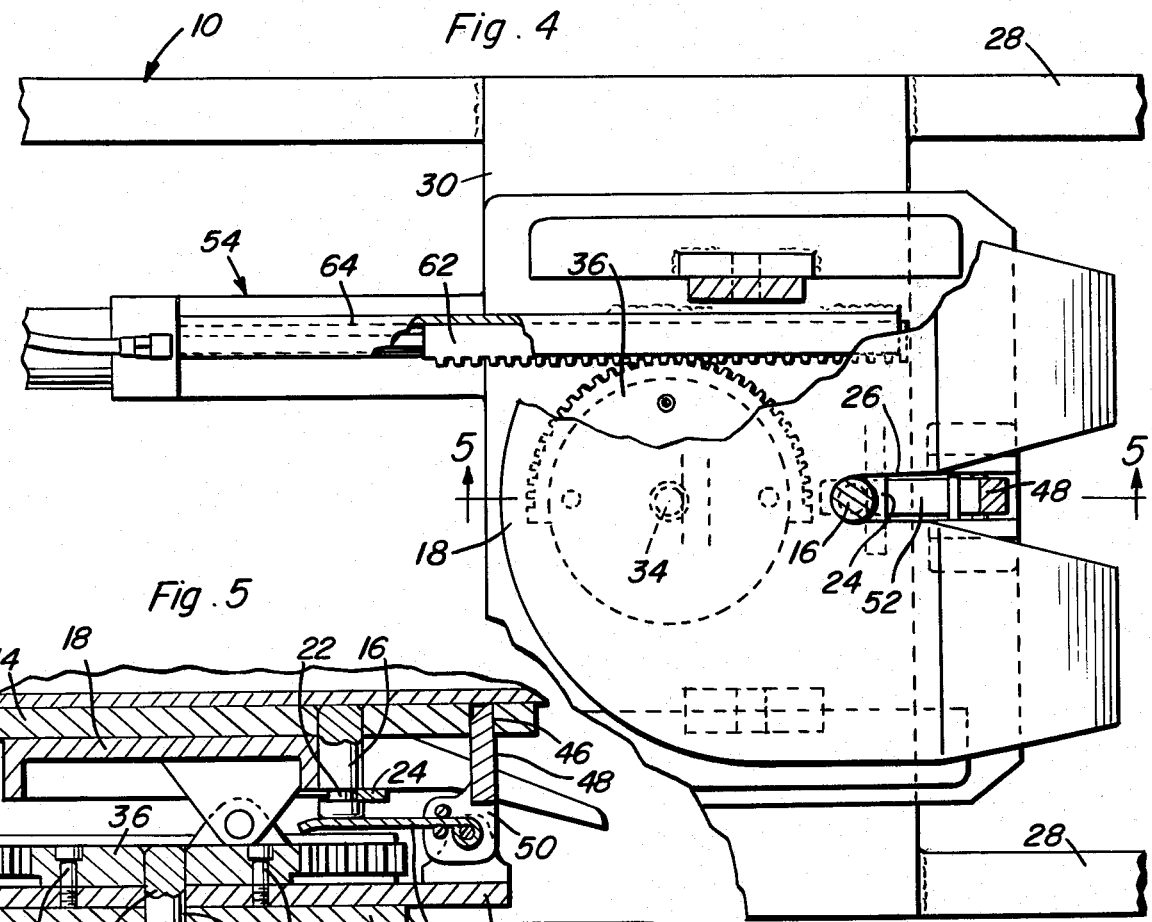
Fig. 4
Fig. 5

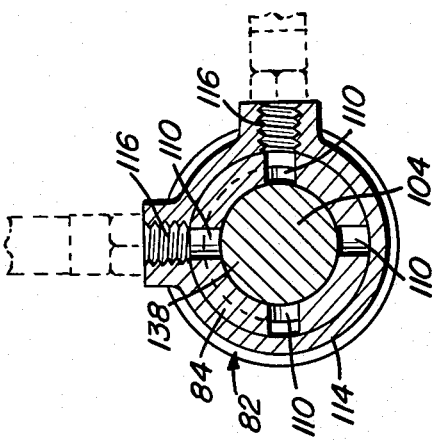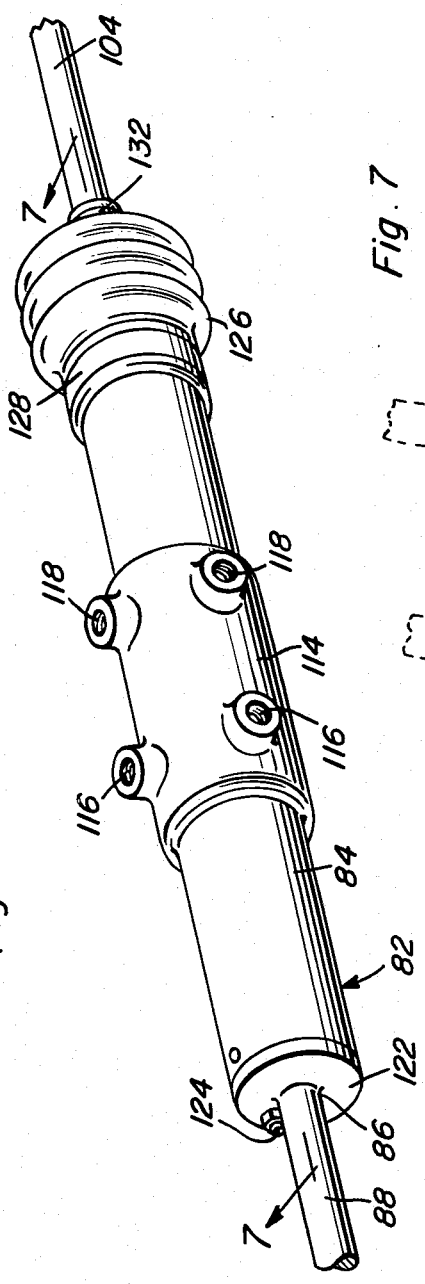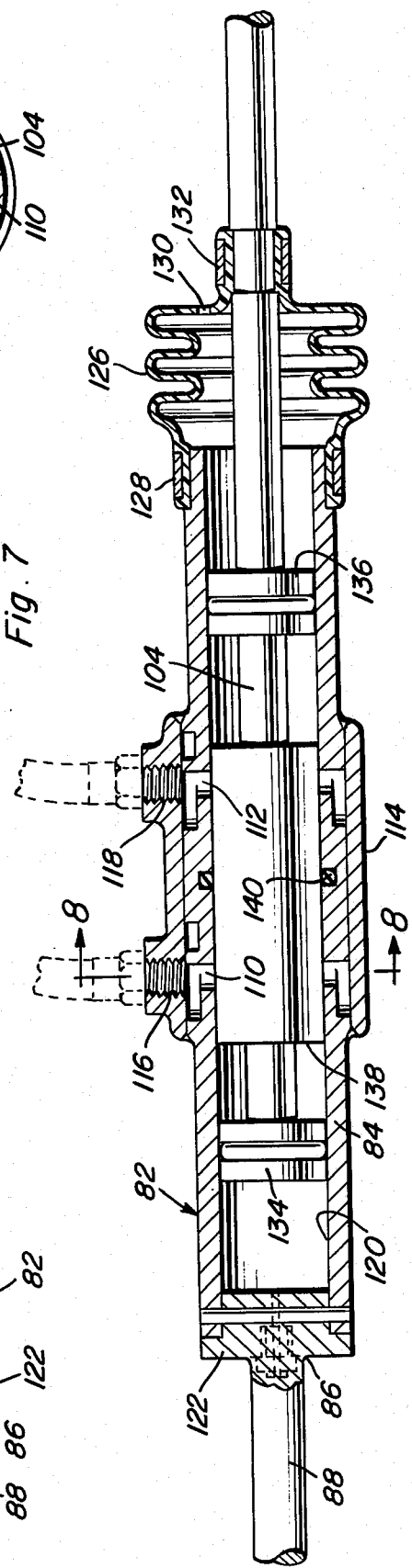

ANTI-JACKKNIFING FIFTH WHEEL ASSEMBLY

BACKGROUND OF THE INVENTION

The instant invention comprises an improvement over the fifth wheel safety device to prevent jackknifing disclosed in my prior U.S. Pat. No. 3,353,841.

In my prior patent the operative connection between the front wheels of the tractor and the rotatable fifth wheel plate was purely mechanical and thus subject to possible breakage in the event the anti-jackknifing system was overstressed. In addition, my previously patented anti-jackknifing structure included considerable structural components which were expensive to manufacture and required more than minimal maintenance.

BRIEF DESCRIPTION OF THE INVENTION

The anti-jackknifing fifth wheel assembly of the instant invention utilizes, in addition to a rack gear shiftable relative to the tractor and a sector gear meshed with the rack gear and supported from the rotatable fifth wheel plate concentric with its axis of rotation, only a pair of double-acting cylinders, hydraulic lines including check valves and relief valves and a spool type control valve in addition to simple linkage interconnecting the steerable front wheels of the tractor with the spool valve and the spool valve with the piston of one of the double-acting cylinders, the piston of the other double-acting cylinder being connected to the rack gear meshed with the sector gear. As a result of this more simplified structure the cost of manufacture is maintained at a minimum and the reliability of the safety device is enhanced to a great degree. Further, through the utilization of a hydraulic system incorporating relief valves the instant invention is protected against abnormal excess stresses.

The anti-jackknifing fifth wheel assembly represents a simple and reliable assembly which is readily adaptable to virtually all existing tractor and semi-trailer combinations. The function of the assembly is to positively control incipient jackknifing and skidding of any semi-trailer which is coupled to a tractor equipped with the assembly of the instant invention. The assembly operates continuously and automatically, and it imposes absolutely no interference with even the most extreme steering maneuvers. It prevents jackknifing and skidding by controlling the amount by which the semi-trailer can be angularly displaced relative to the associated tractor. Unlike some existing systems which restrict this rotation to an arbitrary fixed angle, the assembly of the instant invention automatically varies the maximum allowable angle in response to the angular displacement of the steerable wheels of the tractor. Even during the sharpest turns which may be encountered, the assembly of the instant invention provides positive control of the semi-trailer without interfering with normal operation and without any need for disengaging the system. An important additional feature of this invention is that it is inherently fail-safe, in that no malfunction which might occur within the unit can compromise normal and safe operation of the vehicle.

Another noteworthy aspect of this invention is that it is readily adaptable to a train comprised of a tractor towing one or more full trailers, either with or without an interposed semi-trailer. The basic anti-jackknifing fifth wheel assembly is readily amenable to simple modifications which will enable it to provide a heretofore unattainable degree of control for combination tractor, semi-trailer and full trailer combination vehicles, assisting materially in normal maneuvering in addition to providing continuous protection against jackknifing and skidding.

The main object of this invention is to provide means carried by the tractor portion of a combination vehicle operatively connected between the steerable wheels of the tractor and the semi-trailer or trailer portion operative to allow the semi-trailer portion of the combination to pivot relative to the tractor portion only to those instant positions of relative pivotal movement which would occur with a conventional tractor and semi-trailer or full trailer combination determined by forward movement of the combination accompanied by steering adjustments of the steerable front wheels of the tractor portion of the combination.

Yet another object of this invention is to provide a fifth wheel safety device in accordance with the immediately preceding object and including means by which the device has incorporated therein means by which overloading of the safety device due to abnormal excess stresses may be prevented.

A further object of this invention is to provide a safety device in accordance with the preceding objects including means operative to render the safety device inoperative in order that a tractor and semi-trailer or full trailer combination may be operated in reverse.

Yet another object of this invention is to provide a safety device in accordance with the preceding objects and constructed in a manner whereby very little modification of a semi-trailer is required in order to adapt it for utilization with a tractor equipped with the instant invention.

A final object of this invention to be specifically enumerated herein is to provide a fifth wheel safety device in accordance with the preceding objects and which will conform to conventional forms of manufacture, be of simple construction and automatic in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary side elevational view illustrating those portions of the instant invention directly associated with the fifth wheel of a tractor vehicle and illustrated mounted on the latter and in operative association with the adjacent portions of a semi-trailer;

FIG. 4 is a fragmentary enlarged horizontal sectional view taken substantially upon the plane indicated by the section line 4—4 of FIG. 3;

FIG. 5 is a fragmentary longitudinal vertical sectional view taken substantially upon the plane indicated by the section line 5—5 of FIG. 4;

FIG. 6 is a perspective view of the spool-type control valve portion of the instant invention;

FIG. 7 is an enlarged longitudinal vertical sectional view taken substantially upon the plane indicated by the section line 7—7 of FIG. 6;

FIG. 8 is a vertical transverse sectional view taken substantially upon the plane indicated by the section line 8—8 of FIG. 7;

FIG. 9 is a perspective view of the cylinder portion of the control valve with the body sleeve thereof removed in order to illustrate the porting of the cylinder portion.

DETAILED DESCRIPTION OF THE INVENTION

Figure 1:
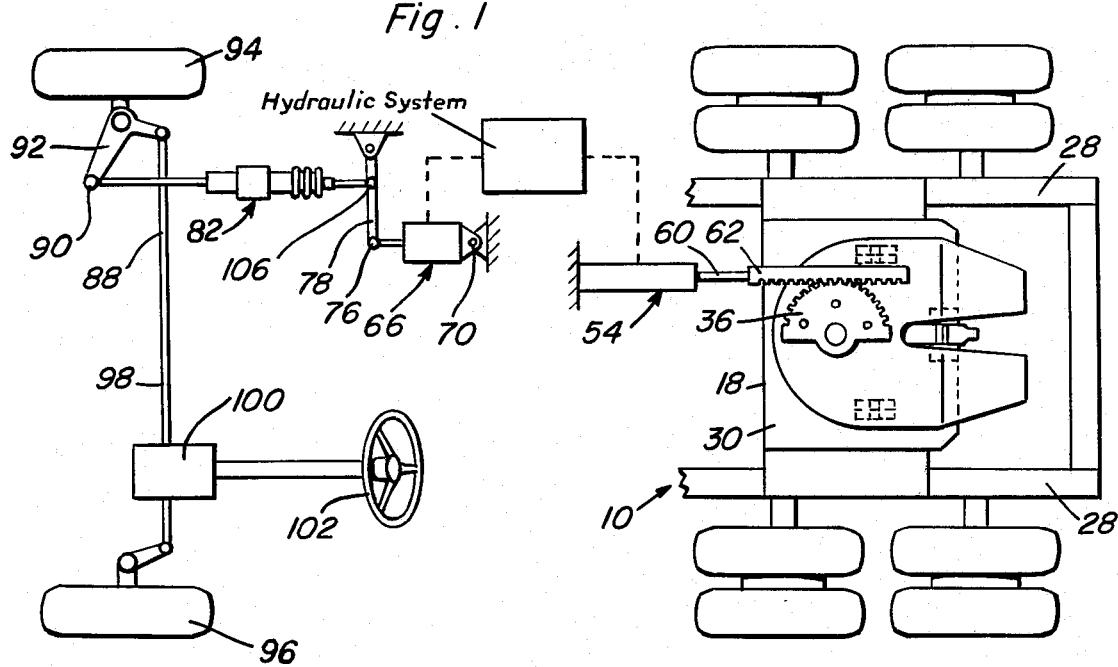
FIG. 1 is a schematic view illustrating the anti-jackknifing fifth wheel assembly of the instant invention operatively associated with the related components of a tractor vehicle designed to pull a semi-trailer.

Referring now more specifically to the drawings, the numeral 10 generally designates a tractor vehicle and the numeral 12 generaly designates a semi-trailer. A support and bearing plate 14 is secured to the underside of the forward end of the semi-trailer 12 in any convenient manner and includes a depending pin 16. A slotted fifth wheel plate 18 is oscillatably supported from the tractor 10 as at 20 for oscillation about a horizontal transverse axis and the lower end of the pin 16 includes a circumferential groove 22. A lock member 24 is shiftably supported from the fifth wheel plate 18 for movement into and out of position behind the pin 16 when the latter is in a full seated position in the forward end of the slot 26 provided in the fifth wheel plate 18, the lock member 24 being received in the groove 22 in order to prevent upward displacement of the pin 16 and thus the forward end of the semi-trailer 12 relative to the fifth wheel plate 18.

The foregoing comprises a description of a conventional fifth wheel connection between a tractor and semi-trailer.

The tractor 10 includes a pair of opposite side longitudinal frame members 28 between which a transversely extending mounting plate 30 is secured and a bearing plate or turntable 32 is rotatably supported from the plate 30 by means of a vertical pivot pin 34 carried by and depending from a sector gear 36 secured to the upper surface of the turntable 32 by means of suitable fasteners 38. The pivot pin 34 projects downwardly through the turntable 32 and is rotatably received in a bore 40 formed in the plate 30. The lower end of the pivot pin 34 projects below the plate 30 and includes a circumferential groove 42 with which a keeper 44 is engaged to prevent upward displacement of the pivot pin 34 relative to the plate 30, the pivot pin 34 being fixed relative to the sector gear 36. Also, it will be noted that the fifth wheel plate 18 is oscillatably supported as at 20 from the turntable 32 as opposed to the equivalent of the support and bracing plate 30, as is conventional.

The rear end portion of the bearing plate 14 includes a bore or pocket 46 into which the arm portion 48 of a bell crank 50 oscillatably supported from the turntable 32 is receivable. The bell crank 50 includes a second spring arm 52 which is engageable by the lower end of the pin 16 upon forward entry of the latter into the slot 26 in order to pivot the arm 48 from a horizontal rearwardly projecting position to the position thereof illustrated in FIG. 5 with the arm 48 received in the bore or pocket 46 and thus locking the bearing plate 14 of the semi-trailer 12 to the fifth wheel plate 18 and thus the turntable 32 against angular displacement of the semi-trailer 12 about an upstanding axis relative to the turntable 32.

Supported in rigid position relative to the frame of the semi-trailer 12 is a first double-acting cylinder referred to in general by the reference numeral 54. The cylinder 54 includes a cylinder portion 56 fixed relative to the tractor 10, a piston 58 slidable within the cylinder portion 56 and a piston rod portion 60 connected to the piston and slidable through the rear end of the cylinder portion 56 and secured to a rack gear or driver member 62 guidingly supported for rectilinear longitudinal reciprocation relative to the trailer 10 by means of a guide structure 64. The rack gear 62 is meshed with the sector gear 36 and accordingly any angular displacement of the semi-trailer 12 relative to the tractor 10 about the pivot pin 34 will cause longitudinal displacement of the rack gear 62 and vice versa. Furthermore, angular displacement of the semi-trailer 12 relative to the tractor 10 about the pivot pin 34 independent of longitudinal shifting of the rack gear 62 is prevented by the engagement of the sector gear 36 with the rack gear 62.

A second double-acting cylinder referred to in general by the reference numeral 66 is also provided and includes a cylinder portion 68 having its rear end pivotally supported from the semi-trailer for oscillation about an upstanding axis as at 70. The second double-acting or control cylinder 66 has a piston 72 slidable therein and a piston rod 74 is connected to the piston 72 and has its free end pivotally connected as at 76 to the free end of a lever 78 having its other end pivotally anchored to the semi-trailer 10 as at 80. Also, a spool type control valve referred to in general by the reference numeral 82 is provided and includes a cylinder portion or actuator member 84 anchored at one end, as at 86, to one end of a thrust or connecting rod 88 having its other end pivotally attached as at 90 to a steering lever or steering control assembly 92 of the right front wheel 94 of the semi-trailer 10. The semi-trailer includes a left steerable front wheel 96 and suitable linkage 98 interconnects the front wheels 94 and 96 for simultaneous steering movements and also the steering box 100 of the semi-trailer to the front wheels 94 and 96, the steering box being actuated by the conventional steering wheel 102.

The control valve 82 further includes a spool 104 whose rear end is received through the rear end of the cylinder portion of the control valve 82 and the rear terminal end of the spool 104 is pivotally attached, as at 106, to the lever 78 intermediate its opposite ends.

Accordingly, it may be seen that steering movements of the front wheels 94 and 96 of the semi-trailer will cause the cylinder portion 84 of the control valve 82 to be longitudinaly shifted relative to the spool 104.

The mid-portion of the cylinder portion 84 includes a first set of radial ports 110 and a second set of similar radial ports 112 spaced along the cylinder portion 84 from the ports 110. A sleeve 114 is secured over the outer surface portions of the cylinder portion 84 through which the ports 110 and 112 open and the sleeve 114 is provided with first and second radial ports 116 and 118 communicated with the ports 110 and 112, respectively.

The cylinder portion 84 defines a longitudinal bore 120 in which the spool 104 is reciprocal and the forward end of the cylinder portion 84 is closed by means of a removable end wall 122 to which the rear end of the thrust rod 88 is secured. Also, the end wall 122 includes a vent 124.

The rear end of the cylinder portion 84 is closed by means of a flexible boot 126 tightly secured over the rear end of the cylinder portion 84 by means of a band 128 and the rear end of the boot, which is vented as at 130, is secured about the spool 104 rearward of the cylinder portion 84 as at 132 by means of a band.

The spool 104 includes a sealing ring-equipped forward piston 134, a sealing ring-equipped rear piston 136 and a central piston portion 138 spaced between the pistons 134 and 136 and of sufficient length to have its opposite ends project beyond the ports 110 and 112, the cylinder portion 84 being equipped with an internal sealing ring 140 engaged with the central piston portion 138.

Figure 2:
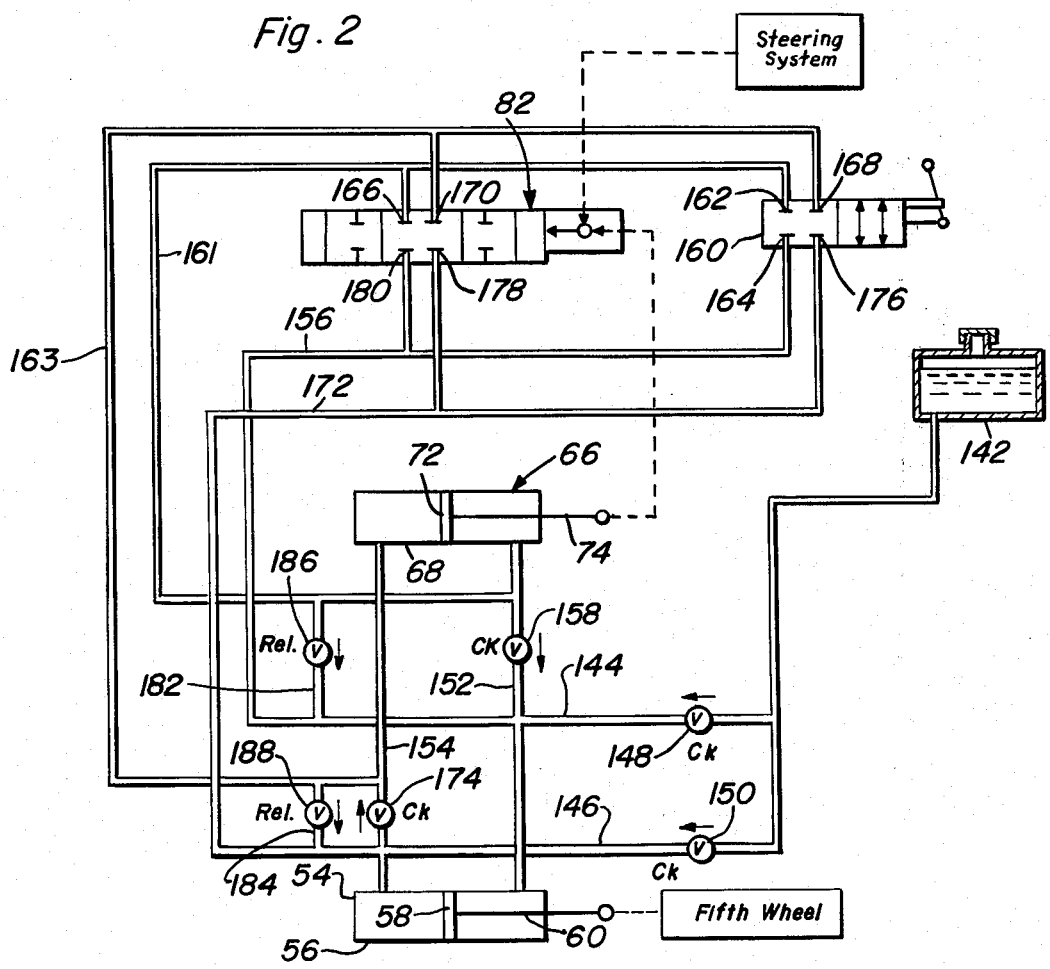
FIG. 2 is a diagrammatic view of the hydraulic system of the antijackknifing fifth wheel assembly.

With attention now invited more specifically to FIG. 2 of the drawings it will be seen that the hydraulic system portion of the instant invention includes a reservoir 142 which gravity feeds into a pair of hydraulic lines 144 and 146 through a pair of check valves 148 and 150, respectively. The lines 144 and 146 are communicated with lines 152 and 154, respectively, and the line 152 has a check valve 158 therein and communicates the piston rod end portions of the interiors of the cylinder portions 68 and 56. The line 154 has a check valve 174 therein and communicates the opposite ends of the cylinder portions 68 and 56. In addition, the line 144 has its end portion remote from the check valve 148 communicated with one end of a line 156 open into a four way two position bypass valve 160 as at 164 and the control valve 182 at 180. The end of the line 146 remote from the check valve 150 is communicated with the bypass valve 160 and the control valve 82 as at 176 and 178 respectively.

The line 152, downstream from check valve 158, is communicated with a line 161 opening into valves 82 and 160 as at 166 and 162, respectively, and the line 154, downstream from check valve 174, opens into line 163 which in turn opens into valves 82 and 160 as at 170 and 168, respectively. Finally, bypass lines 182 and 184 bridge line 144, 161 and lines 146, 163 and include relief valves 186 and 188, respectively.

Figure 10:
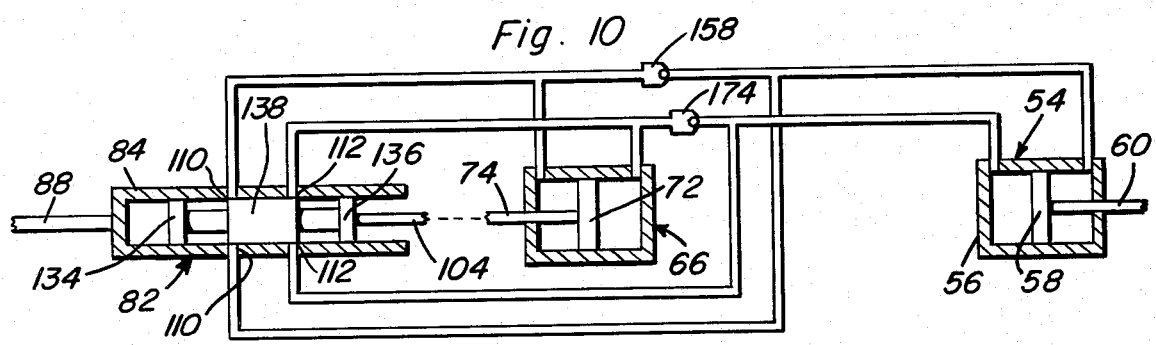
FIGS. 10 through 14 are schematic views of the control valve, control cylinder and fifth wheel cylinder portions of the instant invention with various components thereof in different operative associations with each other and FIG. 10 illustrating the relative positions of the shiftable components in an equilibrium position during straightforward movement of the associated tractor, FIG. 11 illustrating the relative positions of the movable components at the beginning of a left-hand turn, FIG. 12 illustrating the relative positions of the movable components partly into a left-hand turn of the tractor and semi-trailer, FIG. 13 illustrating an equilibrium position of the relatively shiftable components during a left-hand turn and FIG. 14 illustrating the relative positions of the shiftable components during recovery from a lefthand turn.

With reference now more specifically to FIGS. 10 through 14 of the drawings FIG. 10 represents the relative positions of the shiftable components of the cylinders 54 and 66 and the control valve 82 when the tractor 10 is proceeding in a straightforward direction. In this mode of operation the center piston 138 of the control valve 82 blocks the ports 110 and 112 and thus shifting the piston 58 within the cylinder portion 56 in either direction is blocked and the semi-trailer 12 is locked against angular displacement relative to the tractor 10, except in the case of actuation of the bypass valve 160 illustrated in FIG. 2 (omitted from FIGS. 10 through 14 for clarity) and actuation of the relief valves 186 and 188 of FIG. 2 (also omitted from FIGS. 10 through 14 for clarity) under extreme stress conditions.

Figure 11:
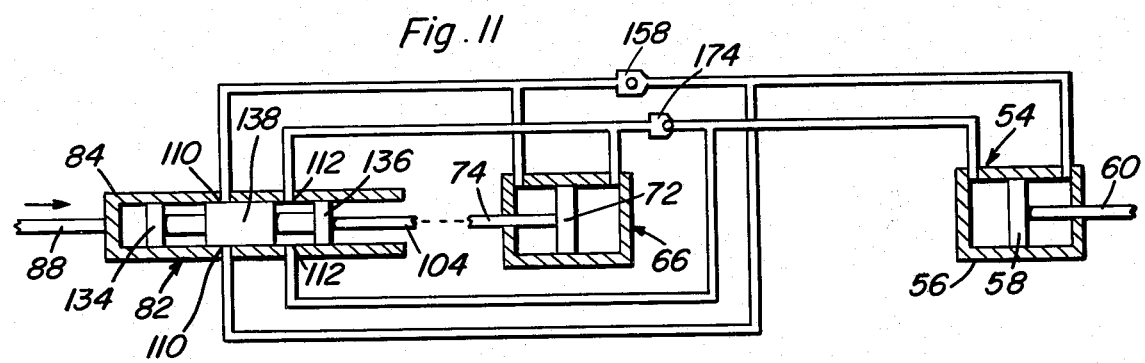

In FIG. 11 of the drawings rearward displacement of the thrust rod 88 is effected as the front wheels 94 and 96 are turned upon entering a left-hand turn. Rearward displacement of the thrust rod 88 causes the cylinder portion 84 of the control valve 82 to be displaced rearwardly or to the right as viewed in FIG. 11 thus uncovering the ports 112 and allowing fluid to be displaced from the right-hand end of the control cylinder 66 and to pass through the control valve 82 and into the left end of the fifth wheel cylindr 54. Also, fluid may be displaced from the right end of the cylinder 54 and into the left end of the control cylinder 66. Thus, initial displacement of the semi-trailer 12 relative to the tractor 10 is allowed.

Figure 12:
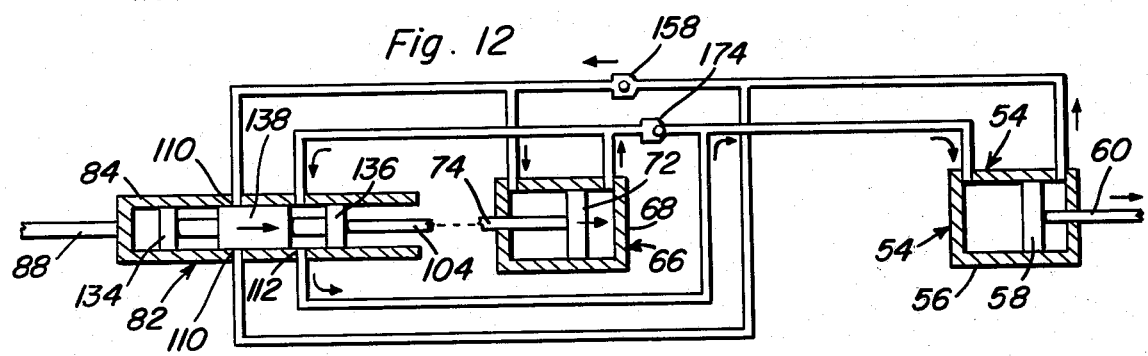
Figure 13:
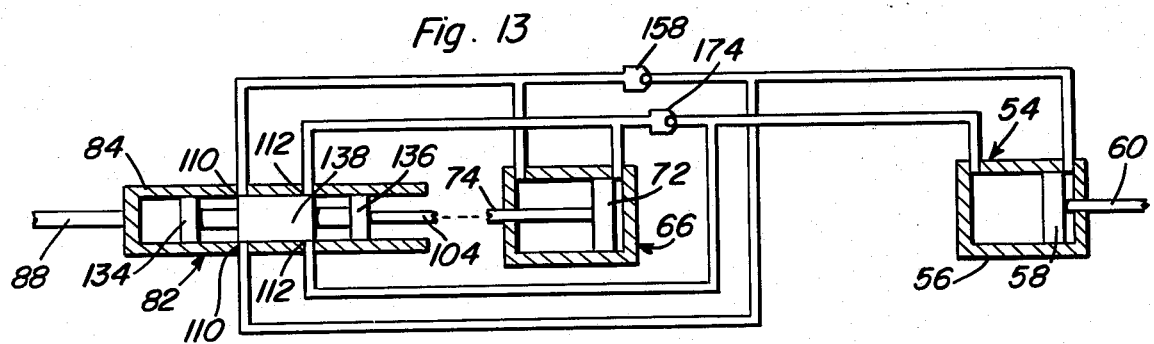

With the front wheels 94 and 96 held stationary in their adjusted left-hand turn positions continued movement into the left-hand turn is represented by FIG. 12 wherein further angular displacement of the semi-trailer 12 relative to the tractor 10 causes additional amounts of fluid to be displaced from the right-hand end of the cylinder 54 and to be pumped into the left-hand end of the cylinder 66 causing further rearward displacement of the piston 72 and thus rearward displacement of the spool 104, independent of further displacement of the thrust rod 88 to the right. Then, as the tractor 10 and semi-trailer 12 reach an equilibrium point of relative angular displacement during the left-hand turn the various shiftable components of the hydraulilc system assume the positons thereof illustrated in FIG. 13 of the drawings with the center piston 38 of the spool 104 again blocking the ports 110 and 112. Thus, any tendency of the semi-trailer 12 to be angularly displaced relative to the tractor 10 is prevented. Further, with attention again invited to FIG. 12, if at any time during relative angular displacement of the semi-trailer 12 relative to the tractor 10 as a result of the tractor 10 and semi-trailer 12 having partially entered a left-hand turn with the hydraulic system components positioned as illustrated in FIG. 12 the rear end of the semi-trailer 12 should have a tendency to slide to the right, this tendency would have the effect of forcing the piston 58 forwardly in the cylinder portion 56. However, such forward movement of the piston 58 to the left as viewed in FIG. 12 of the drawings is prevented due to movement of the piston 72 to the left in the cylinder portion 68 being prevented by the displacement of fluid from the left side of the cylinder portion 68 being blocked by the closed ports 110 and the check valve leading to the right-hand end of the cylinder portion 54.

Figure 14:
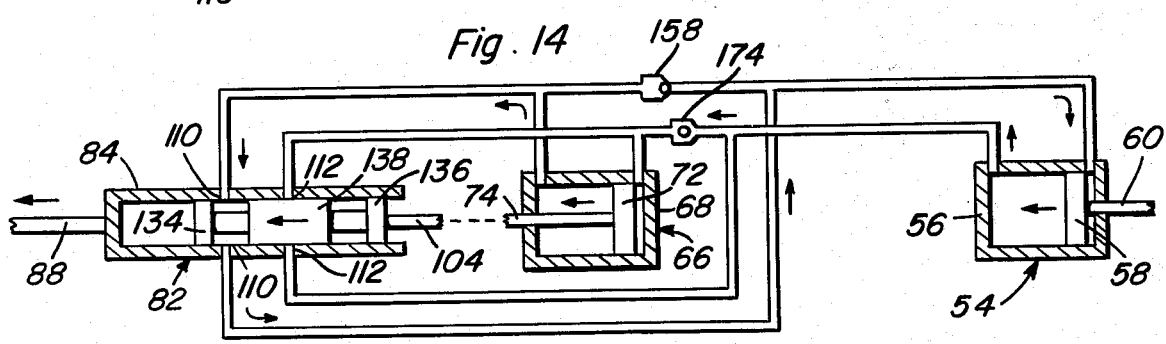

With attention now invited more specifically to FIG. 14, during recovery of the semi-trailer 10 from a left-hand turn return of the wheels 94 and 96 to a straightforward position results in the thrust rod 88 being shifted relative to the cylinder portion 84 to the left as viewed in FIG. 14 of the drawings. Also, gradual angular displacement of the semi-trailer relative to the tractor 10 during recovery from the turn forces the piston 58 in the cylinder portion 56 to the left and thus displaces fluid from the left-hand end of the cylinder portion 56 into the right-hand end of the cylinder portion 68 and fluid from the left-hand end of the cylinder portion 68 is vented therefrom through the control valve ports 110 and into the right end of the cylinder portion 56. Of course, as the semi-trailer 12 continues to move into a position in direct alignment with the tractor 10, forward displacement of the piston 72 to the left within the cylinder portion 68 causes the spool 104 to also shift to the left toward its neutral position within the cylinder portion 84 illustrated in FIG. 10 of the drawings.

It is believed that from the foregoing the process of entering into and recovering from a left-hand turn is not hindered by the anti-jackknifing fifth wheel assembly of the instant invention. Further, from the foregoing description it is believed that the operation of the invention entering into and recovering from a right-hand turn may be readily followed.

In summary, the steering lever or steering control assembly 92 is shifted to turn the front wheels 94 and 96 of the tractor 10 and the rack gear or driver member 62 is shifted in response to relative angular displacement of the tractor 10 and semi-trailer 12 as may be caused by shifting of the steering control assembly 92 during forward movement of the vehicle comprising the tractor 10 and semi-trailer 12. Movement of the driver member 62 is controlled by the fluid pressure means comprising the cylinder 54 and including control means therefor including the control valve 82, the double acting cylinder 66 and the attendant hydraulic lines, check valves 158 and 174 and the pressure relief valves 186 and 188 for controlling operation of the fluid pressure means or cylinder 54 in response to shifting of the steering control assembly 92. The control means includes a shiftable actuator member in the form of the cylinder portion 84 and connecting means is provided in the form of the connecting rod 88 for connecting the steering control assembly 92 to the actuator member or cylinder portion 84 for shifting the latter in response to shifting of the steering control assembly 92. Finally, the control means including valve 82, cylinder 66, the hydraulic lines, valves 158 and 174 and valves 186 and 188, is operative to control shifting of the driver member 62 in response to shifting of the actuator member 84 to allow a change in the relatively angularly displaced positions of the tractor and semi-trailer, other than slight relative pivotal movement, only to the relative positions which would normally be effected independent of the driver member 62 if the steerable wheel control assembly 92 was held in adjusted position and the tractor and semi-trailer were moving forward with no side slippage of the wheels of the tractor and semi-trailer.

It will be noted, however, that at no time is any shifting of the steering controls of the tractor 10 resisted by the anti-jackknifing fifth wheel assembly of the instant invention. The invention merely prevents substantially all relative angular displacement of the trailer relative to the tractor, except that which will shift the trailer toward a position in equilibrium with the tractor as a result of the combined tractor and trailer moving forwardly without wheel side slippage and without change in the adjustment of the tractor steering controls.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a tractor and a trailer pivotally coupled to the tractor for angular displacement relative thereto about an upstanding axis, drive means including a shiftable driver member interconnected between said tractor and trailer for controlling pivoting of the latter in response to shifting of the driver member, fluid pressure means, including control means therefor, operatively associated with said driver member for shifting the latter, said tractor including a shiftable steerable wheel control assembly and said control means including a shiftable actuator member, connecting means connecting said control assembly to said actuator member for shifting the latter in response to shifting of said steering control assembly, said control means further including means operative to control the shifting of said driver member in response to shifting of said actuator member to allow a change in the relatively angularly displaced positions of said tractor and trailer, other than slight relative pivotal movement, only to the relative positions which would normally be effected independent of said driver member if said steerable wheel control assembly was held in adjusted position and the tractor and trailer were moving forward with no side slippage of the wheels of the tractor and the trailer.

2. The combination of claim 1 wherein said control means includes pressure relief means operative to relieve excess pressures which may be encountered under extreme stress conditions.

3. The combination of claim 2 wherein said fluid pressure means includes selectively operable control bypass means operable to render said fluid pressure means inoperative to shift said driver member in response to shifting of said actuator means.

4. The combination of claim 1 wherein said control means includes a spool valve including relatively shiftable spool and cylinder portions, one of said portions comprising said actuator member and the other of said portions being operatively connected to one of the piston rod and cylinder portions of a first double-acting hydraulic cylinder, said drive means including a second double-acting hydraulic cylinder, fluid pressure lines communicating corresponding opposite ends of said cylinders and including oppositely opening check valves, means connecting the other portion of said first cylinder with one of the piston rod and cylinder portions of the second cylinder, the other portion of said second cylinder being anchored to said tractor, said lines including bypass portions bypassing said check valves, and said spool valve including two sets of ports interposed in said bypass portions and being operable, in response to shifting of said one portion of said spool valve, to selectively establish and terminate communication between the ports of each set of ports and to inversely establish and terminate communication of the ports of said sets of ports.

5. In combination, support means, a first member substantially freely adjustably oscillatable relative to said support means between limit positions, a second member oscillatable relative to said support between limit positions, the various positions to which said second member may be shifted defining positions corresponding to predetermined positions to which said first member may be shifted, and motion restricting connecting means operatively connected between said first and second members allowing movement, other than slight movement, of said second member from any instant position thereof only in that direction of movement which will shift said second member toward the position thereof which corresponds to the adjusted position of said first member and only to such an extent in that direction which will position said second member in the position thereof which corresponds to the adjusted position of said first member.

6. The combination of claim 5 wherein said motion restricting connecting means includes a fluid pressure system including pressure relief means operative to relieve excess pressures and allow movement of said second member in said direction in excess of said extent of movement and in the opposite direction in the event forces in excess of predetermined forces are applied to said second member to shift the latter relative to said support means.

7. The combination of claim 5 wherein said support comprises a tractor and said second member comprises a trailer coupled to said tractor for oscillation relative thereto about an upstanding axis, said first member comprising an oscillatable steering control of said tractor.

8. The combination of claim 5 wherein said motion connecting means includes a closed loop hydraulic circuit through at least portions of which hydraulic fluid is pumped in reverse directions in response to oscillation of said second member relative to said support, said circuit including means defining restrictions to free fluid flow therethrough, whereby said hydraulic circuit constitutes means increasingly resisting increases in speed of angular displacement of said second member relative to said support.

9. In combination, a wheeled tractor and a wheeled trailer pivotally coupled to the tractor for angular displacement relative thereto about an upstanding axis, said tractor including steerable front wheel means actuated by a reversibly shiftable operator member, a closed loop hydraulic circuit, reversible fluid pump means serially connected in said circuit for pumping fluid therethrough in opposite directions, relative angular displacement sensing means operatively connected between said tractor and trailer and including a driver member reversibly shiftable in response to relative oscillation of said tractor and trailer about said axis, means drivingly connecting said driver member to said pump means for reversing actuation thereof in response to relative reversed movement of said driver member, and valve means connected in said circuit for selectively controlling the flow of fluid therethrough, said valve means including first and second independent and relatively shiftable actuator portions oscillatably shiftable in response to shifting of said steering operator member and said driver member, respectively, the various predetermined positions to which one of said members may be shifted defining positions corresponding to predetermined positions to which the other member may be shifted, said members being associated with their respective valve actuator portions for shifting the latter in response to shifting of the former, said valve means being operative to terminate fluid flow through said circuit in response to said actuator portions being positioned in any of said corresponding positions and to allow fluid flow through said circuit in response to said actuator portions being positioned in other than predetermined corresponding positions, said various predetermined positions of said members being those positions in which said members are disposed when said tractor and trailer are moving forwardly with said operator member stationary and said tractor and trailer disposed in constant relative angularly displaced positions, including aligned positions thereof, independent of side slippage of the wheels of the tractor and trailer.

10. In combination, a wheeled tractor including a first front wheel steering member substantially freely adjustably oscillatable relative to said tractor between limit positions, a second wheeled trailer member oscillatable relative to said tractor between limit positions, the various positions to which said second trailer member may be shifted defining positions corresponding to predetermined positions to which said first steering member may be shifted, and motion restricting connecting means operatively connected between said first steering and second trailer members allowing movement, other than slight movement, of said second trailer member from any instant position thereof only in that direction of movement which will shift said second trailer member toward the position thereof which corresponds to the adjustedd position of said first steering member and only to such an extent in that direction which will position said second trailer member in the position thereof which corresponds to the adjusted position of said first steering member, said corresponding positions of said members being those positions in which said members are disposed when said tractor and trailer are moving forwardly with said first front wheel steering member stationary and said tractor and second trailer member disposed in constant relative angularly displaced positions, including aligned positions thereof, independent of side slippage of the wheels of the tractor and trailer.

* * * * *